United States Patent
Zhang et al.

(10) Patent No.: US 10,326,852 B2
(45) Date of Patent: Jun. 18, 2019

(54) PROXY FOR MONITORING SPECIAL HANDLING OF CONTENT WITHIN A SERVICE NETWORK

(71) Applicant: Verizon Patent and Licensing Inc., Arlington, VA (US)

(72) Inventors: Gong Zhang, Waltham, MA (US); Jian Huang, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 126 days.

(21) Appl. No.: 15/079,307

(22) Filed: Mar. 24, 2016

(65) Prior Publication Data

US 2017/0279912 A1 Sep. 28, 2017

(51) Int. Cl.
*G06F 15/16* (2006.01)
*H04L 29/08* (2006.01)

(52) U.S. Cl.
CPC ........ *H04L 67/2819* (2013.01); *H04L 67/141* (2013.01); *H04L 67/146* (2013.01); *H04L 67/327* (2013.01)

(58) Field of Classification Search
CPC .................................................. H04L 67/2819
USPC ......................................................... 709/213
See application file for complete search history.

(56) References Cited

U.S. PATENT DOCUMENTS

| | | | |
|---|---|---|---|
| 6,567,857 B1* | 5/2003 | Gupta ................. | H04L 67/2804 370/235 |
| 6,769,009 B1* | 7/2004 | Reisman .................... | G06F 8/65 705/27.1 |
| 7,123,613 B1* | 10/2006 | Chawla ................... | H04L 69/16 370/389 |
| 7,401,115 B1* | 7/2008 | Arsenault ........... | H04L 67/2814 370/352 |
| 7,568,041 B1* | 7/2009 | Turner .................. | H04L 65/105 709/231 |
| 9,450,878 B2* | 9/2016 | Calo ...................... | H04L 47/122 |
| 2002/0069241 A1* | 6/2002 | Narlikar .................. | H04L 29/06 709/203 |
| 2006/0056317 A1* | 3/2006 | Manning ................. | H04L 29/06 370/254 |
| 2007/0180496 A1* | 8/2007 | Fransdonk ........... | G06Q 20/027 726/3 |
| 2014/0013001 A1* | 1/2014 | Cox ..................... | H04L 67/1002 709/230 |
| 2014/0059190 A1* | 2/2014 | Calo ...................... | H04L 47/122 709/221 |
| 2015/0237168 A1* | 8/2015 | Arsenault ............... | H04L 67/42 709/203 |
| 2017/0118264 A1* | 4/2017 | Huang ................ | H04L 65/4084 |

(Continued)

*Primary Examiner* — Hamza N Algibhah (57) ABSTRACT

A device intercepts a request from a requesting device, and the request includes a network address or a universal resource locator (URL) for content. The device determines whether special handling is applicable when forwarding the content to the requesting device. The device establishes a session between the content device and the requesting device, and the session exchanges data via a pathway that includes a proxy. The proxy identifies data, including the requested content, exchanged in the session and determines whether the special handling was used when forwarding the data. The proxy forwards reporting data identifying the exchanged data and indicating whether the special handling was used when exchanging the data through the session.

20 Claims, 7 Drawing Sheets

(56) References Cited

U.S. PATENT DOCUMENTS

2017/0195330 A1* 7/2017 Ren .................. H04W 12/08
2017/0230478 A1* 8/2017 Huang ............... H04L 67/327

* cited by examiner

PROXY FOR MONITORING SPECIAL HANDLING OF CONTENT WITHIN A SERVICE NETWORK

BACKGROUND

A user device, such as a computer or smart phone, may access various content (e.g., a webpage, multimedia content, programs, services, etc.) through a service network. In some instances, the service network may provide special handling of certain content from a content provider, such as an operator of a web page or web service. In one example, the service network may transmit certain content to the user device using a specialized path that provides certain performance attributes (e.g., certain levels of bandwidth, delay, jitter, packet losses, etc.). In another example, the service network may transmit certain content to the user device using a different protocol, priority (e.g., a quality of service value), and/or access fees relative to other data available from the content provider. For instance, access by the user device to wireless communication networks and data services typically involves some form of payment made to the network provider, but in some instances, a third party (e.g., the content provider) may sponsor a user's data consumption in order to entice user engagement. However, because the service network and the content provider are separate entities, the content provider may not easily verify that the service network does, in fact, provide special (e.g., sponsored) handling of certain, designated content and forward other, non-designated content without special handling.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Certain embodiments described herein relate to directing content provided by a content device (e.g., a content server) through a proxy. For example, a user device, such as a smart phone, may use a network address associated with the content from the content device to request access to the content. The network address may include data (e.g., a "proxy extension") that causes the content from the content device to be routed through the proxy. The content is transported from the content device to the user device through a service network, such as a wireless wide area network (WWAN), and the proxy may determine whether the service network applies a special handling procedure for the content.

The special handling may relate to the delivery of the landing page, such as transmitting the landing page along a specialized path that provides certain performance attributes (e.g., certain levels of bandwidth, delay, jitter, packet losses, etc.) and/or a path that includes a specific node. In one example, the special handling may related to sponsored data services (also referred to herein as a "toll free data service") in which access to a landing page by a user device is financially supported by a third party entity. The third party entity, hereinafter referred to as a "sponsor," subsidizes the network data exchanged between a user device and a specified content provider. The sponsor may have a relationship with the network provider that permits the automatic billing of the sponsor for the exchanged data, instead of the user of a user device. Thus, the data exchanged through the sponsored data services (which may also be referred to herein as "sponsored data" or "sponsored content") is effectively "toll-free" as seen by the user of the user device.

To enable the user device to access the content through special handling (e.g., sponsored access) and ensure that the sponsor is billed for the sponsored data exchange, an extension for a network address associated with the content may be generated and used in connection with the network address to form a "signed" address. For example, the user device may be redirected to a validation device, and the validation device may determine whether the user device is eligible to receive special handling of the content. If the user device is eligible to receive special handling of the content, the validation device may "sign" the network address for the content (e.g., add an extension to the network address) and return the signed address to the user device. A user device may access sponsored content by making network requests using the signed network addresses. In an embodiment, the hyper-text transfer protocol (HTTP) may be used to exchange the data, so the signed network address for the landing page may take the form of a sponsored data service universal resource locator (URL), hereinafter referred to as an "signed URL" or a "toll-free URL." The special handling extension may identify, for example, a type of special handling to be applied, sponsor, a given node to include in a path within the service network, etc.

The proxy may determine that the service network uses special handling for content when the user device requests the content using a signed address. Similarly, the proxy may determine that the service network did not use special handling for content when the user device uses an unsigned address (e.g., an address without a special handling extension) to request the content. The proxy may generate a report identifying content from the content device that received special handling within the service network and other content from the content device that did not receive special handling within the service network.

Figure 1:
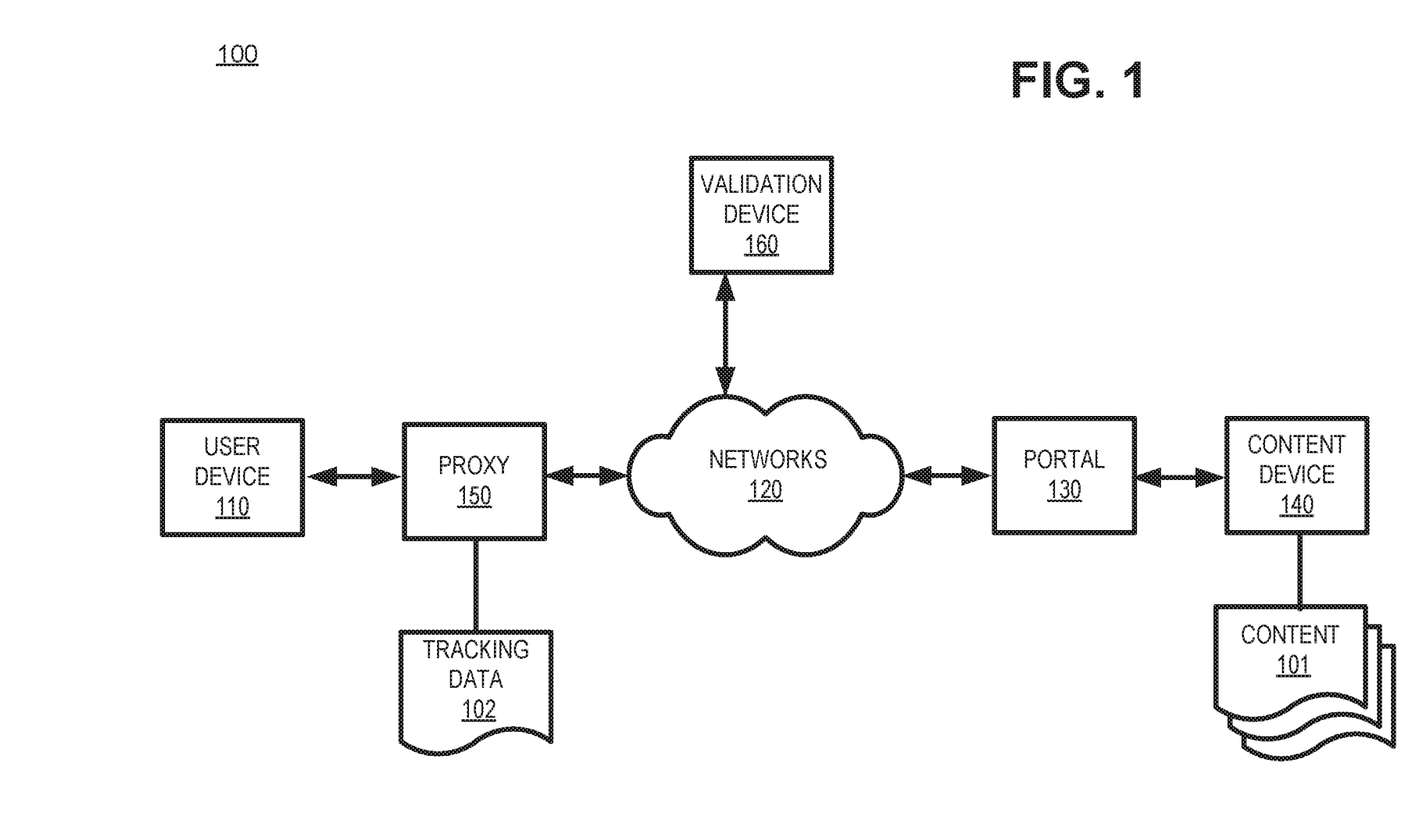
FIG. 1 is a block diagram of an exemplary environment for providing special handling of content through a proxy.

FIG. 1 is a block diagram of an exemplary environment 100 for tracking special handling of content 101. Environment 100 may include, for example, a user device 110; a network(s) 120, a portal 130; a content device 140, a proxy 150 and a validation device 160.

User device 110 may be an electronic device having communication capabilities to access content 101 over network 120. User device 110 may include, for example, a cellular telephone, a smart phone, a wearable computer (e.g., a wrist watch, eye glasses, etc.), a tablet, a set-top box (STB), a mobile phone, any type of Internet protocol (IP) communications device, a voice over IP (VoIP) device, a laptop computer, a palmtop computer, a gaming device, a media player device, or a digital camera that includes communication capabilities (e.g., wireless communication mechanisms).

Network 120 may be a service network that enables user device 110 to access content 101 from content device 140. Network 120 may include one or more wireless networks, such as a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. In another example, network 120 may include a wireless local area wireless network (WLAN), such as a network implemented using WiFi (e.g., an international Electrical and Electronics Engineering (IEEE) 801.11x network, whereby x=a, b, g, n, ac, ah, etc.) or Bluetooth® under IEEE 802.15.1. Additionally or alternatively, network 120 may include backhaul networks, backbone networks, and/or core networks.

Network 120 may selectively apply special handling when forwarding content 101 to user device 110. For example, a sponsor may support sponsored access by the user device 110 to content 101. In another example, network 120 may enable user device 110 to access content 101 in a different manner (e.g., via a different path, a different network priority, a different protocol, etc.) than normally available to user device 110.

To enable special handling of data and/or services (e.g., sponsored access via one or more portions of network 120), an associated URL may include data to enable the special handling. For example, a URL associated with content 101 may include an extension that identifies the special handling (e.g., priority routing, sponsored access, etc.) and data that enables special handling of content 101 within environment 100. For example, requests for sponsored content may be intercepted by network devices in backend infrastructure (not shown) which are responsible for tracking downloaded toll free data and billing sponsors for the cost of transmitting the data.

Portal 130 may be a network device, such as a server, computer, etc., that receives a request for content 101 and may determine whether the data should be forwarded to user device 110 using special handling procedures. In another example, portal 130 may be a virtual machine (e.g., a software application) that operates on a device, such as content device 140. For example, portal 130 may provide an interface to receive data from a sponsor identifying data, such as content 101, that is eligible for sponsored (e.g., toll-free) access through network 120. Portal 130 may further interface with validation device 160 and/or a component of network 120 to obtain security credentials used for signing network addresses to validate requests from user device 110.

To enable network 120 to provide special handling of content 101, an associated URL may include special handling data. For example, a URL associated with content 101 may include an extension that identifies the special handling (e.g., priority routing, sponsored access, etc.) and data that enables the identified special handling within network 120.

For example, when user device 110 presents a URL associated with content 101, portal 130 may identify the extension or other data associated with the special handling. Portal 130 may initiate a session via network 120 in accordance with the special handling identified in the URL and forward the requested content 101 via the generated session. For example, if the special handling relates to sponsored data services, portal 130 may generate a session via network 120 and may notify a backend component, such as billing server, that the fees associated with data transmission on the session should be allocated to a sponsor. In another example, if the special handling relates to providing priority data handling of content 101, portal 130 may generate a session via network 120 and may notify a policy enforcement component that content 101 should be prioritized relative to other traffic transmissions in network 120.

As described herein, when user device 110 requests to access content 101 from content device 140, portal 130 may initiate a session for forwarding content, portal 130 may generate the session to include proxy 150. For example, an IP address for proxy 150 may be included in a URL used by user device 110 to request content 101. More specifically, the URL may include an extension identifying a special handling procedure and other information for the special handling and another extension identifying proxy 150.

Content device 140 may provide access to content 101 through network 120. Content device 140 may be a network device (e.g., a web server, computer, media repository, streaming source, etc.) that may provide access to data (e.g., content 101) associated with network addresses. For example, the signed network address may link to sponsored or other specially handled data that is hosted locally on content device 140 or remotely on another device. Content device 140 may be owned by the sponsor or act as an agent of the sponsor, serving as a "middle man" to provide access for sponsored content to user device 110 from any content provider identified by signed network identifiers.

As used herein, content 101 may also be referred to herein as "media," and may include any type of digital data representing user-interpretable information, including text, image, audio, and/or video data. Media may also include one or more combinations of any type of digital data that may be arranged, composited, and presented to the user, for example, in the form of webpages described using hypertext markup language (HTML). Although shown as being provided by content device 140, it should be appreciated that content 101 may include links to other device (not shown), such as devices associated with other content providers, data hosting services, application servers, etc.

Because portal 130 and content device 140 may be managed by separate entities, content device 140 may not easily determine whether content 101 received correct handling within network 120. For example, content device 140 may designate certain content 101 to receive special handling, but cannot actually verify that network 120 applied the correct special handling to the designated content 101. Furthermore, mistakes may occur when content device 140 designates content 101 to receive special handling. For example, when content device 140 designates certain content 101 to receive special handling, content device 140 may or may not intend other related content (e.g., content linked to the designated content 101) to also receive special handling. Furthermore, since special handling may be applied when forwarding content 101 to certain user devices 110 (e.g., user devices 110 located in a geographic location, implementing certain software, associated with certain users, etc.) and not for other user devices 110, content device 140 may not be able to determine how frequently special handling is being applied when forwarding content 101.

Proxy 150 may be a network device, such as a server, computer, etc., that receives content 101 being forwarded through network 120 and may determine whether special handling procedures are being applied. In another example, proxy 150 may be a virtual machine (e.g., a software application) that operates on a device, such as user device 110. As previously described, proxy 150 may be included in a session for forwarding content 101 to user device 110. Proxy 150 may monitor the session to identify whether special handling is applied within the session (e.g., by network 120). For example, proxy 150 may determine whether a URL forwarded from user device 110 includes a specially handling extension. Proxy 150 may then generate tracking data identifying content 101 received by user device 101 through special handling (e.g., via a high bandwidth/priority data transmission) and identifying other content received by user device 101 without special handling (e.g., via a low bandwidth/priority data transmission). In certain implementation, proxy 150 may forward tracking data 102 and/or a report generated based on tracking data 102 to user device 110 and/or content device 140. In this way, proxy 150 may enable user device 110 and/or content device 140 to determine when content 101 receives special handling within network 120. Tracking data 102 may identify, for example, the signed URLs used by user device 110 to request content 101 from content device 140 and may provide an indication of whether special handling was used within network 120 when forwarding content 101 to user device 110.

Tracking data 102 may further include additional information above the special handling, such as identifying, when the special handling was not used, whether the URL included a signed extension (e.g., a request for special handling) and explain why the special handling was not used despite the signed extension. For example, tracking data 102 may indicate that a signature (or passcode) for special handling, included in the URL, expired because more than threshold amount of time passed between the passcode being issued (e.g., by validation device 160, as described below), the signature was already used and user device 110 needed to obtain another signature, the signature was not applicable to user device 110 and/or content 101 (e.g., was given to a different user device 110). Tracking data 102 may further identify content 101 and/or other content from content device 140 that did not receive special handling. Tracking data 102 may include attributes (e.g., size, data type, source, destination, etc.) of content 101 and/or other content from content device 140.

In another example, tracking data may include information regarding how special handling was performed at portal 130 and/or content device 140. For example, portal 130, when receiving a request for special handling of content 101 (e.g., a signed URL), may determine whether content 101 is designated by content device 140 for special handling. Portal 130 may determine, for example, whether content device 140 has previously identified content 101 as being eligible for special handling (e.g., based on receiving a prior request for special handling of content 101) and/or based on receiving instructions from content device 140. If content 101 was previously identified as being eligible for special handling, portal 130 may store (e.g., cache) permission from content device 140 to apply the special handling. Portal 130 may forward, to proxy 150, when special handling is applied, an indication of whether a cached permission was used or whether portal 130 contacted content device 140 for new permissions, and proxy 150 may include this information in tracking data 102. In this way, tracking data 102 may identify if portal 130 is unnecessarily requesting permissions (e.g., forwarding more than a threshold number of authorization requests during a time period and not using a cached authorization) or is incorrectly not requesting permissions (e.g., not forwarding an authorization request after a prior authorization expired).

User device 110 may request a special handling address (e.g., a signed URL) from validation device 160. For example, user device 110 may forward, to validation device 160, information identifying a URL for content 101. Additionally or alternatively, user device 110 may forward identifying information to validation device 160. The identifying information may include, for example, an internet protocol (IP) address, a media access control (MAC) address, a serial number, a telephone number, an international mobile subscriber identity (IMSI), etc.

Validation device 160 may be a cloud-based application server associated with network 120. Validation device 160 may determine, based on information received from user device 110, whether special handling should be used to forward content 101 to user device 110. For example, validation device 160 may interact with backend components of network 120 to determine whether user device 110 is associated with a customer type (e.g., a residential consumer versus a business customer), a geographic location, a device type (e.g., a device compatible with the special handling), etc., that is designated to receive the special handling of content 101. Validation device 160 may then modify (e.g., "sign") a URL or network address for content 101 to user device. For example, the modified URL may include a first extension or other data that indicates, to portal 130, that user device 110 has been evaluated for special handling of content 101. The modified URL may further indicate whether special handling should be used for content 101. In this way, user device 110 may be evaluated with respect to content 101 using an identifier and/or other potentially confidential information without sharing this information with content device 140 or a third party not associated with network 120.

The modified URL forwarded from validation device 160 may further include a second extension that identifies proxy 150. For example, the modified URL may include data identifying an IP address associated with proxy 150, and portal 130, when initiating a session for forwarding content 101, may route the session through proxy 150. In one example, the second extension may be added by validation device 160. In another example, the extension may be added by an application, such as media player, operating on user device 110. The second extension causes content 101, when forwarded from content device 140 via network 120, to be passed through proxy 150 regardless of whether special handling is applied. For example, portal 130 may establish a session via portal 150, and content 101 may be forwarded via the session. Furthermore, when content 101 is forwarded from content device 140 through another network (e.g., a service network that differs from network 120), content 101 may be passed through proxy 150.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the devices or networks may perform one or more functions described as being performed by another one or more of the other devices or networks. The devices and networks shown in FIG. 1 may interconnect via wired connections, wireless connections, or a combination of wired and wireless connections.

Figure 2:
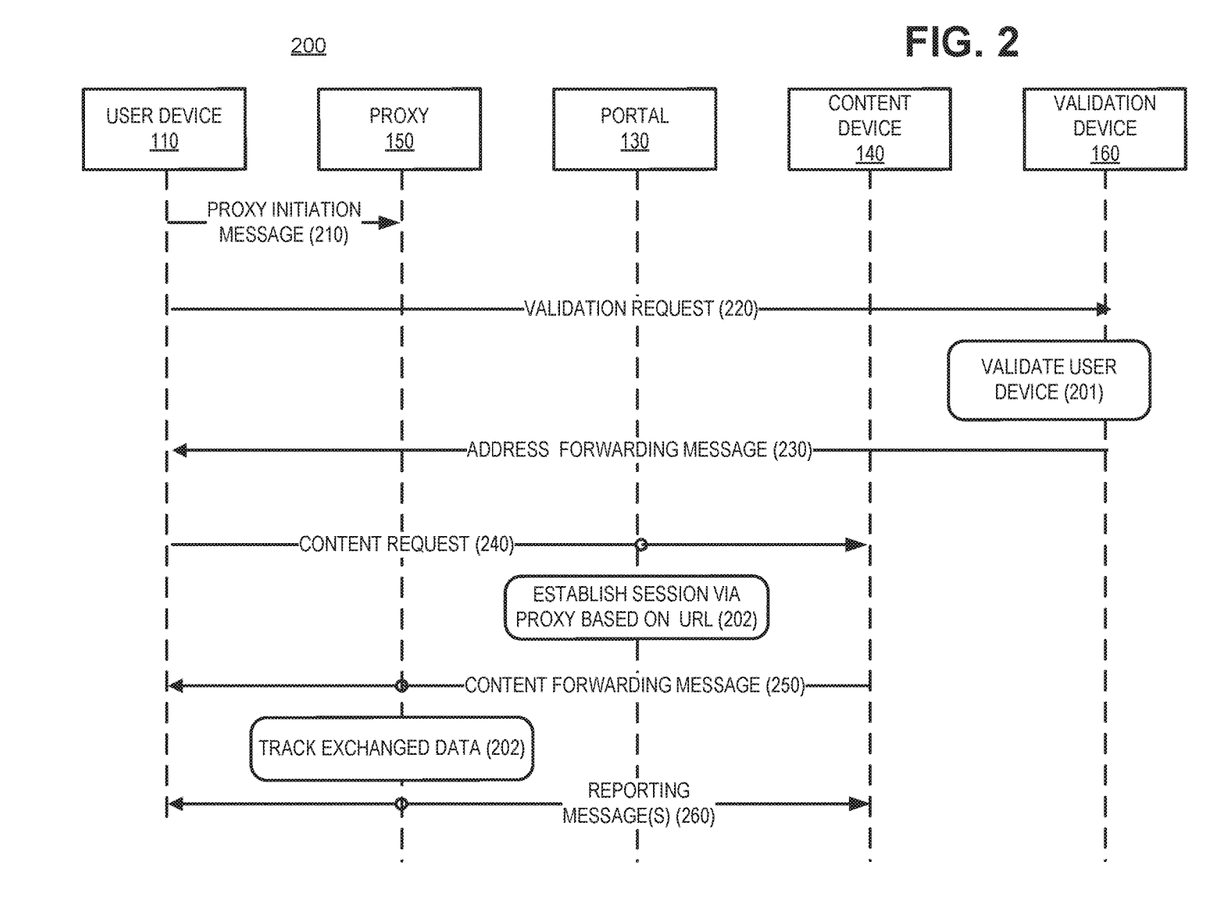
FIG. 2 is a diagram depicting an exemplary message flow between selected devices within the network environment shown in FIG. 1.

FIG. 2 is depicts an exemplary message flow diagram 200 that relates to selectively using special handling to provide content 101 to user device. More specifically, as shown in FIG. 2, message flow diagram 200 may include messages between user device 110, portal 130, content device 140, proxy 150, and validation device 160 within the network environment shown in FIG. 1.

As shown in FIG. 2, user device 110 may forward a proxy initiation message 210 to associate user device 110 with proxy 150. In one example, proxy 150 may be a software-implemented virtual machine operating on user device 110 and/or content 140, and proxy initiation message 210 may cause proxy 150 to be instantiated. In another example, proxy 150 may be a separate device, and proxy initiation message 210 may cause proxy device 150 to be linked with user device 110 and portal 130 such that data transmitted between user device 110 and portal 130 passes through proxy 150.

In certain implementations, content device 140 may forward a special handling request (not shown) to portal 130. Special handling request 210 may identify content 101 to receive special handling, and a type of special handling to be applied to content 101 by network 120. For example, the special handling request may include data identifying an address (e.g., a URL) associated with content 101. Additionally, the special handling request may identify criteria for applying the special handling to content 101. For example, the special handling request may identify a time period when special handling should be applied and/or eligibility rules for user device 110. Eligibility rules may identify types of customers (e.g., customers at a geographic location), types of eligible user devices 110 (e.g., smart phones implementing certain hardware/software), etc. that receive content 101 through special handling.

Portal 130 may forward special handling instructions (not shown) to validation device 160. The special handling instructions may identify the contents of the special handling request (e.g., the URLs for content 101, the special handling to be applied, the eligibility requirement, etc.). The special handling instructions may further include information from network 120, such as additional eligibility criteria, data identifying a sponsor (e.g., a content provider) when the special handling relates to sponsored access, etc. Validation device 160 may store an address (e.g., a URL) for content 101 to receive special handling and the eligibility criteria (block 201).

When user device 110 wishes to access content 101, user device 110 may forward a validation request 220 that identifies a URL for content 101 to validation device 160. Validation request 220 may include a storage address associated with content 101. For example, validation request 220 may include a network address for content device 140 (or another device providing content 101) and other information (e.g., a port, memory portion, file name, etc.) associated with content 101.

Additionally, validation request 220 may include identifiers, addresses, and/or other information for user device 110. Validation request 220 may also include a network address or other information associated with user device 110. Furthermore, validation request 220 may include information identifying a geographic location of user device 110, hardware/software being implemented by user device 110, other data being accessed by user device 110, prior access of content 101 by user device 110, etc.

User device 110 may send validation request 220 when user device 110 wishes to access a certain type of data (e.g., multimedia content) that may be eligible for special handling. In another example, content device 140 and/or validation device 160 may forward a list identifying data that may be eligible for special handling, and user device 110 may forward validation request 220 to request access to content 101 if content 101 is included in the list.

Validation device 160 may validate user device 110 with respect to special handling of content 101 (block 201). For example, validation device 160 may determine whether user device 110 is eligible to receive special handling of content 101 through network 120. Validation device 160 may use the identifying information for user device 110, as included in validation request 220, to interface with backend components of network 120 to obtain additional information regarding user device 110 and/or an associated user. For example, validation device 160 may determine a device type, compatible transmission protocols, a geographic location, account data, etc., associated with user device 110. Validation device 160 may then apply logical rules associated with special handling of content 101. For example, the logical rules may indicate that special handling (e.g., sponsor access) of content 101 may be used when user device 110 is associated with a specific type of customer for a wireless network service provider (e.g., a residential customer) in a specific geographic location.

Validation device 160 may modify (e.g., sign) the URL for content 101, and validation device 160 may forward an address forwarding message 230 to user device 110 to forward the modified URL. For example, validation device 160 may append extensions to the URL for content 101 and forward the appended URL to user device 110 in address forwarding message 230. One of the extensions may include an indication, such as a specific string of alphanumeric characters, indicating whether any type of special handling should be used when forwarding content 101 to user device 110. The extensions may further include data identifying proxy 150, such as an IP address for proxy 150. Address forwarding message 230 may further include code, instructions, or script that causes user device 110 to be redirected to content device 140 using the modified (e.g., signed) URL. For example, the script in address forwarding message 230 may cause user device 110 to forward a content request 240, which includes the modified (e.g., signed) URL toward content device 140.

As shown in FIG. 2, portal 130 may intercept content request 240. Portal 130 may determine, based on the extension in the modified URL for content 101, that special handling procedures should be used to forward content 101 from content device 140 to user device 110. For example, portal 130 may establish a session based on the special handling identified in the modified URL (block 202), and portal 130 may forward the content request 240 to content device 140 to cause content 101 to be forwarded to user device 110 via the generated session, as content forwarding message 260.

As previously described, the modified URL, included in content request 240, may include data identifying proxy 150, such as address for proxy 150. Portal 130 may direct the session so that content 101 passes through proxy 150. Proxy 150 may track the exchanged data forwarded through the session (block 204), such as to determine whether special handling is applied for content 101. Proxy 150 may forward a reporting message 260 to user device 110 and/or to content device 140. Reporting message 260 may include tracking data 102, such as information identifying data (e.g. content 101) forwarded from content device 140 through network 120. Reporting message 260 may further identify whether the special handling was applied to the exchanged data, the user devices 110 receiving the data, etc. In another example, example, if the special handling related to sponsors access to content 101, proxy 150 may forward, as reporting message 260, information to user device 110 identifying any fees for accessing content 101 via network 120. In one implementation, proxy 150 may forward different reporting messages 260 to user device 110 and content device 140. For example, a first reporting message 260 to a given user device 110 may include only tracking data 102 related to content 101 accessed by that user device 110, whereas a second reporting message 260 to content device 140 may include tracking data 102 for all content 101 forwarded via network 120.

While FIG. 2 shows exemplary messages in message flow diagram 200, in other implementations, message flow diagram 200 may include fewer messages, different messages, differently ordered messages, or additional messages than depicted in FIG. 2. Additionally, or alternatively, one or more messages of message flow diagram 200 may include data described as being included in one or more other messages of message flow diagram 200.

Figure 3:
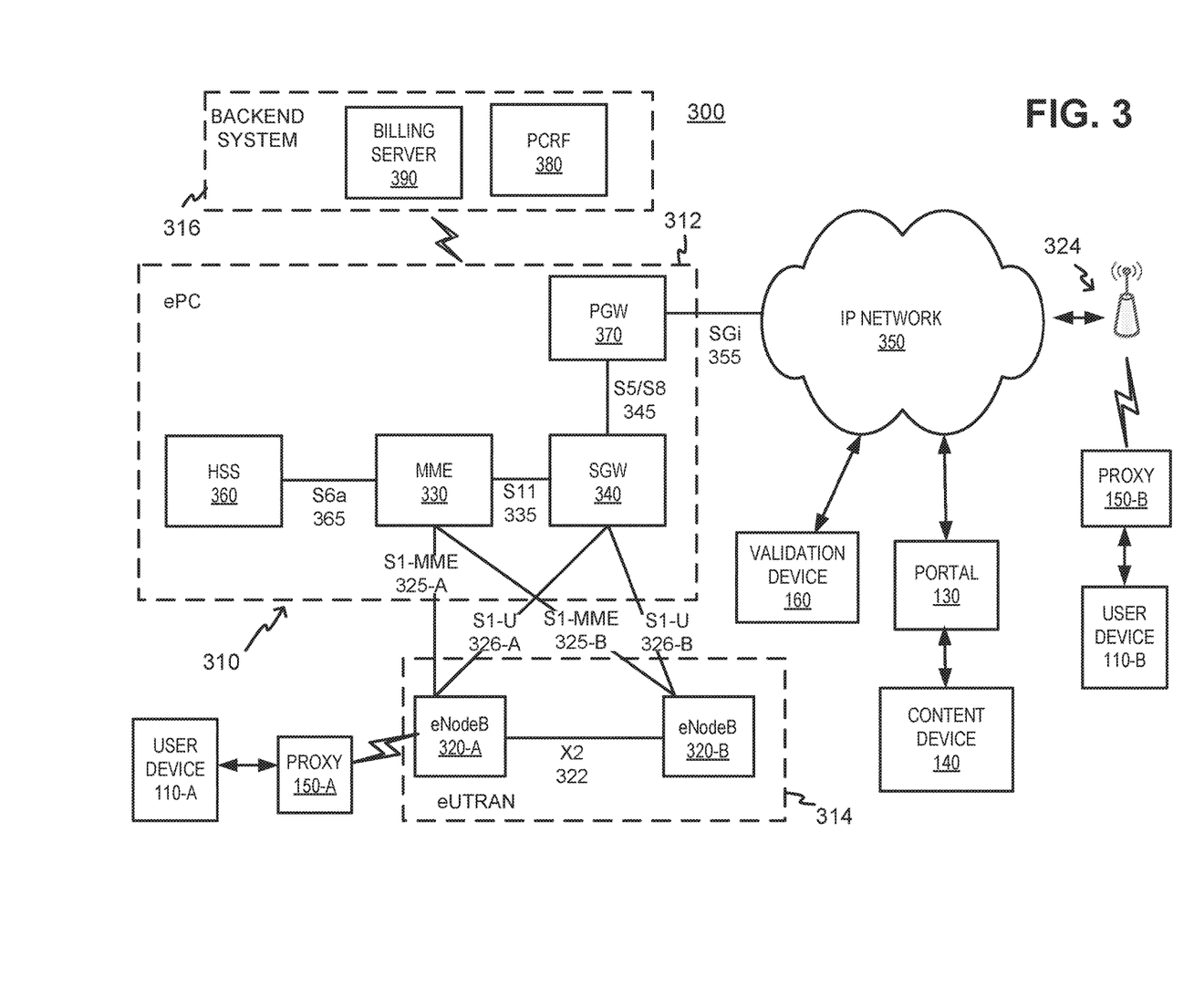
FIG. 3 is a block diagram of an exemplary wireless environment for providing special handling of content through the proxy of FIG. 1.

FIG. 3 is a block diagram of an exemplary wireless networking system 300 according to certain implementations. As shown in FIG. 3, wireless networking system 300 may include user device 110 (shown in FIG. 3 as user devices 110-A and 110-B), a wireless network 310 which includes an evolved Packet Core (ePC) 312 and an evolved UMTS Terrestrial Network (eUTRAN) 314, a backend system 316, an Internet Protocol (IP) network 350, a WiFi wireless access point (WAP) 324, portal 130, content device 140, proxy 150 (shown in FIG. 3 as proxies 150-A and 150-B), and validation device 160. In wireless networking system 300, user device 110, portal 130, content device 140, proxy 150, and validation device 160 may operate in a manner consistent with the prior discussion of FIGS. 1 and 2.

Wireless network 310 may be a long-term evolution (LTE) network, and include one or more devices that are physical and/or logical entities interconnected via standardized interfaces. Wireless network 310 provides wireless packet-switched services and wireless IP connectivity to user devices to provide, for example, data, voice, and/or multimedia services. In this example, user device 110 (shown in FIG. 3 as user devices 110-A and 110-B) may correspond to user equipment (UE) adapted to communicate via wireless network 310 that corresponds to an LTE network. As shown in FIG. 3, ePC 312 may further include a mobility management entity (MME) device 330, a serving gateway (SGW) 340, a packet data gateway (PGW) 370, and a home subscriber server (HSS) 360. The eUTRAN 314 may further include one or more eNodeBs 320-A and 320-B (herein referred to plurally as "eNodeB 320" and individually as "eNodeB 320-*x*"). As further shown in FIG. 3, backend systems 316 may include a policy and charging rule function (PCRF) 380 and a billing server 390.

eNodeB 320 may include one or more devices and other components having functionality that allow user device 110 to wirelessly connect to eUTRAN 314. eNodeB 320-A and eNodeB 320-B may each interface with ePC 312 via an S1 interface, which may be split into a control plane S1-MME interface 325-A/B and a data plane S1-U interface 326. For example, S1-MME interface 325-A may interface between MME device 330 and eNodeB 320-A. S1-MME interface 325-A may be implemented, for example, with a protocol stack that includes a Network Access Server (NAS) protocol and/or Stream Control Transmission Protocol (SCTP). S1-U interface 326-B may provide an interface between SGW 340 and eNodeB 320-A. S1-U interface 326-B may be implemented, for example, using a General Packet Radio Service Tunneling Protocol version 2 (GTPv2). eNodeB 320-A may communicate with eNodeB 320-B via an X2 interface 322. X2 interface 322 may be implemented, for example, with a protocol stack that includes an X2 application protocol and SCTP.

MME device 330 may implement control plane processing for ePC 312. For example, MME device 330 may implement tracking and paging procedures for user device 110, may activate and deactivate bearers for user device 110, may authenticate a user of user device 110, and may interface to non-LTE radio access networks. A bearer may represent a logical channel with particular quality of service (QoS) requirements. MME device 330 may also select a particular SGW 340 for a particular user device 110. A particular MME device 330 may interface with other MME devices 330 in ePC 312 and may send and receive information associated with user devices 110, which may allow one MME device to take over control plane processing of user devices 110 serviced by another MME device, if the other MME device becomes unavailable.

SGW 340 may provide an access point to and from user device 110, may handle forwarding of data packets for user device 110, and may act as a local anchor point during handover procedures between eNodeBs 320. SGW 340 may interface with PGW 370 through an S5/S8 interface 345. S5/S8 interface 345 may be implemented, for example, using GTPv2.

PGW 370 may function as a gateway to IP network 350 through a security gate interface (SGi) 355. IP network 350 may include, for example, an IP Multimedia Subsystem (IMS) network, which may provide voice and multimedia services to user device 110, based on Session Initiation Protocol (SIP). A particular user device 110, while connected to a single SGW 340, may be connected to multiple PGWs 370, one for each packet network with which user device 110 communicates.

Alternatively, user device 110 may exchange data with IP network 350 though WiFi wireless access point (WAP) 324. The WiFi WAP 324 may be part of a local area network, and access IP network 350 through a wired connection via a router. Alternatively, WiFi WAP 324 may be part of a mesh network (e.g., IEEE 801.11s). WiFi WAP 324 may be part of a local area network, or part of a wide area network (WiMaxx) or a mesh network (IEEE 801.11s).

MME device 330 may communicate with SGW 340 through an S11 interface 335. S11 interface 335 may be implemented, for example, using GTPv2. S11 interface 335 may be used to create and manage a new session for a particular user device 110. S11 interface 335 may be activated when MME device 330 needs to communicate with SGW 340, such as when the particular user device 110 attaches to ePC 312, when bearers need to be added or modified for an existing session for the particular user device 110, when a connection to a new PGW 370 needs to be created, or during a handover procedure (e.g., when the particular user device 110 needs to switch to a different SGW 340).

HSS 360 may store information associated with user devices 110 and/or information associated with users of user devices 110. For example, HSS 360 may store user profiles that include authentication and access authorization information. MME device 330 may communicate with HSS 360 through an S6a interface 365. S6a interface 365 may be implemented, for example, using a Diameter protocol.

As previously described, portal 130 may be configured to detect and redirect requests for content 101 and may cause content device 140 to selectively apply special handling when forwarding content 101 to user device 110. For example, portal 130 may generate a session through a standard TCP/IP interface with IP network 350, and the session may further include ePC 312 using SGi 355. Content device 140 may forward data associated with content 101 via the generated session. As described above, the session may route traffic through proxy 150, and proxy 150 may determine whether special handling is applied without wireless networking system 300. In one example, proxy 150 may interface with one or more backend components (e.g., PCRF 380 and/or billing server 390) to determine whether special handling is applied for exchanging content 101.

Communications between content device 140 and user devices 105 may be performed through ePC 312 and eUTRAN 314 as shown for user device 110-A, or through WiFi WAP 324 as shown for user device 110-B. The communications between content device 140 and user device 110 may be channel agnostic, and thus may be performed using any known wireless and/or wired channels, or combinations thereof. Accordingly, other methods for communication between content device 140 and user device 110 may be used which are not illustrated in FIG. 3. In the example shown in FIG. 3, a first portal 150-A (e.g., associated with a first IP address) may be used when content 101 is forwarded via eUTRAN 314, and a second, different portal 150-B (e.g., associated with a second IP address) may be used when content 101 is forwarded via WAP and not through eUTRAN 314.

Validation device 160 may communicate with user device 110 via IP network 350. For example, validation device 160 may be associated with a cloud-based service for evaluating the eligibility of user device 110 to receive content 101 using special handling (e.g., sponsored access).

PCRF 380 may provide policy control decisions and flow based charging control functionalities. PCRF 380 may provide network control regarding service data flow detection, gating, quality of service (QoS) and flow based charging, etc. PCRF 380 may determine how a certain service data flow shall be treated, and may ensure that user plane traffic mapping and treatment are in accordance with a user's subscription profile. For example, PCRF 380 may identify and apply a user profile related to user device 110 when exchanging data using a conventional handling procedures. In other instances, when content 101 is transmitted using special handling procedures, PCRF 380 may apply an alternative, different user profile (e.g., so content 101 can be forwarded to user device 110 with a different network priority, along a different path, using a different transmission protocol, using different security/encryption techniques, etc.).

Billing server 390 may store data identifying changes in services (e.g., based on receiving instructions from portal 130) and may modify user and device profiles, as applied by HSS device 360 and/or PCRF 380 based on the service changes. Billing server 390 may further determine and collect fees associated the requested service changes. For example, billing server 390 may charge a service fee to user device 110 for accessing content 101 when specialized (e.g., sponsored) data access is not authorized by validation device 160. Additionally, billing server 390 may be programmed to charge a sponsor, and not user device 110, for accessing content 101 when the sponsored data access is authorized by validation device 160 with respect to user device 110.

While FIG. 3 shows exemplary components of wireless networking system 300, in other implementations, wireless networking system 300 may include fewer components, different components, differently arranged components, or additional components than depicted in FIG. 3. Additionally, or alternatively, one or more components of wireless networking system 300 may perform functions described as being performed by one or more other components of wireless networking system 300.

Figure 4:
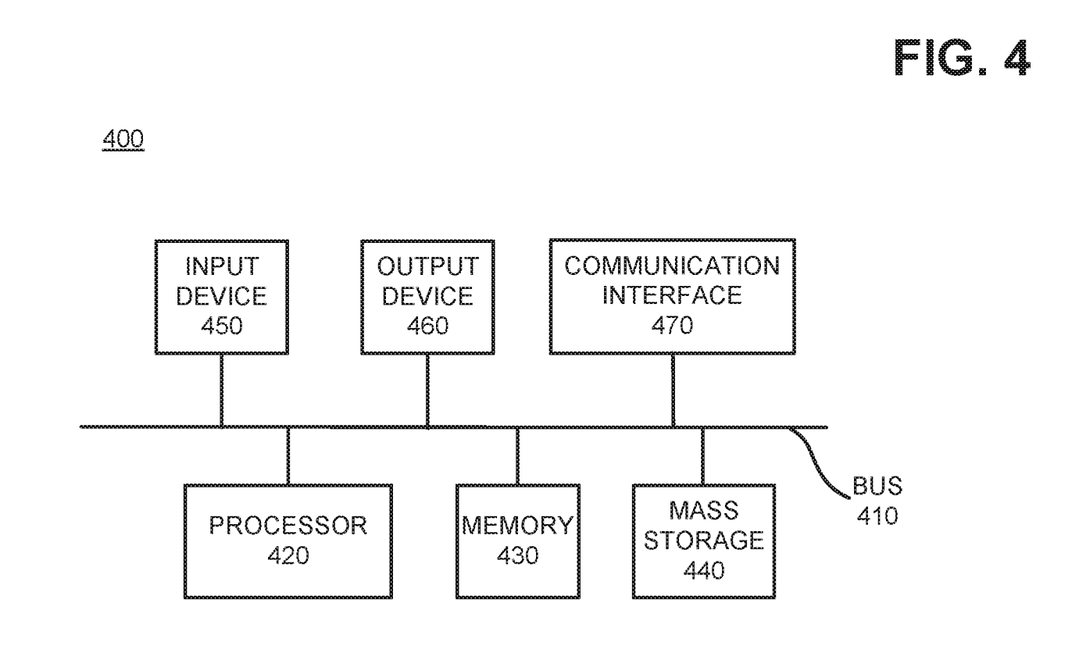
FIG. 4 is a block diagram showing exemplary components of a computing device included in the environment of FIG. 1 according to an embodiment.

FIG. 4 is a block diagram showing exemplary components of a computing device 400 according to one implementation. As shown in FIG. 4, computing device 400 may include a bus 410, a processor 420, a memory 430, mass storage 440, an input device 450, an output device 460, and a communication interface 470. User device 110, portal 130, content device 140, proxy 150, validation device 160, or other components illustrated in FIGS. 1 and 3 may each include one or more computing devices 400.

Bus 410 includes a path that permits communication among the components of computing device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to network 120.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Mass storage 440 may include any type of on-board device suitable for storing large amounts of data, and may include one or more hard drives, solid-state drives, and/or various types of redundant array of independent disks (RAID) arrays.

Input device 450 may enable an operator to input information into computing device 400, if desired. Input device 450 may include, for example, a keyboard, a mouse, a pen, a microphone, a remote control, an audio capture device, an image and/or video capture device, a touch-screen display, and/or another type of input device. In some embodiments, computing device 400 may be managed remotely and may not include input device 450. Output device 460 may output information to an operator of computing device 400. Output device 460 may include a display (such as a liquid crystal display (LCD)), a printer, a speaker, and/or another type of output device. In some embodiments, computing device 400 may be managed remotely and may not include output device 460.

Communication interface 470 may include a transceiver that enables computing device 400 to communicate within network 120 with other devices and/or systems. The communication interface 470 may be configured to exchange data with network 120 over wired communications (e.g., conductive wire, twisted pair cable, coaxial cable, transmission line, fiber optic cable, and/or waveguide, etc.), or a combination of wireless. In other embodiments, communication interface 470 may interface with network 120 using a wireless communications channel, such as, for example, radio frequency (RF), infrared, and/or visual optics, etc. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

Computing device 400 may perform various operations, and computing device 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of computing device 400, in other implementations, computing device 400 may include fewer components, different components, additional components, or differently arranged components than depicted in FIG. 4. Additionally, or alternatively, one or more components of computing device 400 may perform functions described as being performed by one or more other components of computing device 400.

Figure 5:
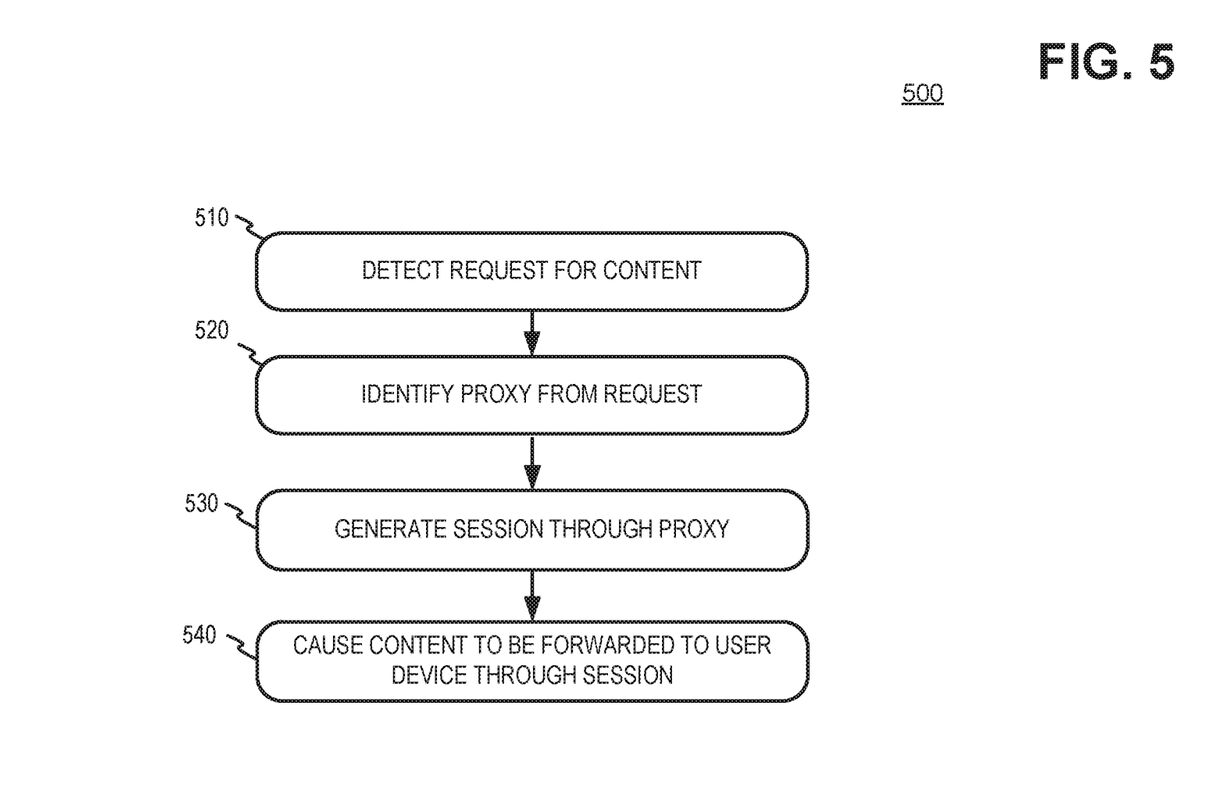
FIG. 5 is a flow chart showing an exemplary process for selectively providing special handling of a content through a proxy.

FIG. 5 is a flow diagram showing an exemplary process 500 for selectively providing special handling of content 101 through proxy 150. In one embodiment, process 500 may be performed by portal 130. In other embodiments, one or more portions of process 600 may performed by one or more other components of environment 100 and/or wireless networking system 300, such as user device 110, content device 140, validation device 160 and/or a component of network 120.

As shown in FIG. 5, process 500 may include portal 130 detecting a request for content 101 (block 510). For example, portal 130 may be positioned to receive URLs or other requests directed to content device 140 and may identify content 101 associated with the received requests. Portal 130 may detect content request 240 forwarded from user device 110. In one implementation, content request 240 may be sent by another device, such as another user device 110. For example, a user may provide an input (such as a purchase request) to the other device to request delivery of content 101 to user device 110. In another implementation, content request 240 may be forwarded by a content device 140 or another device without a user input. For example, content 101 may be "pushed" to user device 110 to update other content and/or to provide new content and/or services.

Portal 130 may identify proxy 150 from the request (block 520). For example, content request 240, received in block 510, may include data, such as an extension, identify an address for proxy 150, and portal 130 may parse the request to identify proxy 150. In this example, different proxies 150 may be used for different content 101, user devices 110, networks 120, content devices 140, etc., and portal 130 may determine one of the proxies 150 based on content request 240. In another implementation, portal 130 may identify proxy 150 based on different and/or additional factors. For example, portal 130 may store data indicating that certain types of content 101 (e.g., multimedia), content 101 from certain content devices 140, and/or content 101 being forwarded to certain user devices 110 should be forwarded to proxy 150.

In one implementation, portal 130 may select a proxy 150 from a plurality of proxies 150 based on content request 240. For example, content request 240 may include an IP address or other identifier for a specific portal 150. In another example, content request 240 may identify a given user device 110, and portal 130 may identify a proxy 150 associated with the given user device 110. In yet another example, portal 130 may select a proxy 150 based on attributes of content 101, such as a content type (e.g., multimedia content), delivery type (e.g., whether content 101 is streamed or downloaded user device 110).

As shown in FIG. 5, portal 130 may generate a session through proxy 150 (block 530) based on content request 240. For example, portal 130 may evaluate whether a received URL requesting content 101 includes a special handling extension (e.g., an extension assigned by validation device 160). For example, portal 130 may determine whether the URL for the landing page, received from user device 110, includes an extension or other data indicating whether special handling should be used for content 101. In another example, portal 130 may determine whether the URL for content 101 is included in a list of URLs identifying specially handling data. In one implementation, the special handling extension may also include information that may be used for the special handling, such as data identifying a sponsor or a campaign associated with the sponsored accessed to content 101.

If portal 130 determines that content 101 should not receive special handling, portal 130 may generate a session through proxy 150 for conventional handling in block 530. For example, portal 130 may establish a session based on account records for user device 110 that are stored by PCRF 380 (e.g., using conventional handling procedures). For example, portal 130 may establish a session based on account records for user device 110 stored in PCRF 380 (e.g., using conventional handling procedures). Otherwise, if portal 130 determines that content 101 should receive special handling (e.g., based on content request 240), portal 130 may generate a session through proxy 150 for special handling based on the extension in block 530. Portal 130 may generate the session based on the data included in the extension identifying the special handling. For example, if user device 110 receives sponsored (e.g., toll-free) access to content 101, portal 130 may generate a session in which data transfer fees are billed to a sponsor. Alternatively, if the extension indicates the user device 110 is not eligible for the special handling (e.g., user device 110 should be billed for accessing content via network 120), portal 130 may generate a session in which data transfer fees are billed to user device 110.

Portal 130 may cause content 101 to be forwarded to user device 110 through the session (block 540). For example, portal 130 may forward an IP address for proxy 150 to content device 140, and content device 140 may forward content 101 to the IP address for proxy 150. Proxy device 150 may redirect received content 101 to user device 110. Thus, content device 140 may forward content 101 toward user device 110 (e.g., via proxy 150) without knowing an IP address or other identifying information for user device 110. In this way, anonymity of user device 110 may be maintained from content device 140.

In one implementation, portal 130 may forward a message to proxy device 150 identifying content 101 and user device 110. Proxy device 150, when receiving content 101, may identify that user device 110 is the intended recipient and forward content 101 to user device 110.

In one implementation, special handling may enable user device 110 to access additional content when special handling is authorized for content 101. For example, the additional content may identify media, services, and/or applications that may be accessed by user device 110 and that may not be available through non-special handling. In another example, additional, related data (e.g., data linked to content 101, encryption information or other data used by user device 110 to access content 101, etc.) may be forwarded from content device 140 to user device 110. Portal 130 may determine whether to apply any special handling to the other data. For example, portal 130 may determine whether special handling request 210 indicates that special handling should be used for the additional data.

Figure 6:
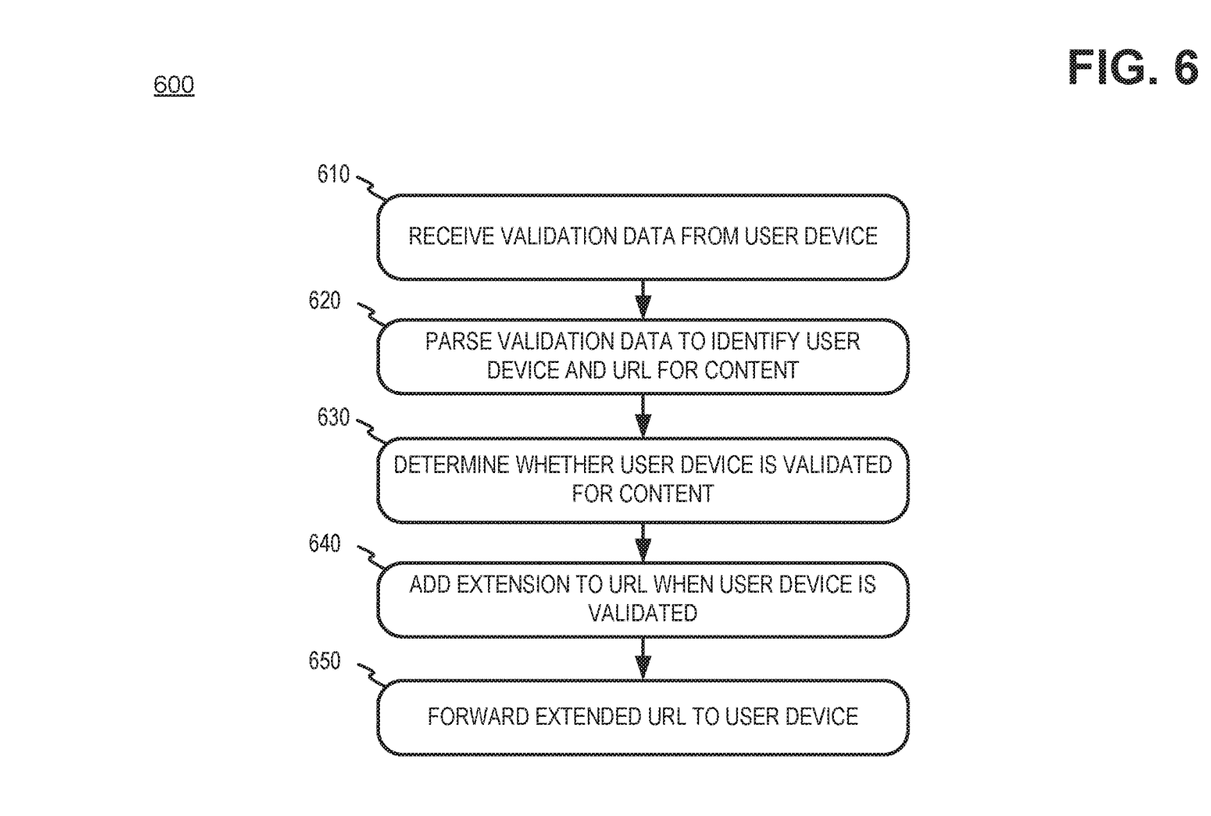
FIG. 6 is a flow chart showing an exemplary process for determining whether a user device of the environment in FIG. 1 is eligible for special handling of content.

FIG. 6 is a flow chart showing an exemplary process 600 for determining whether user device 110 is eligible for special handling of content 101. In one embodiment, process 600 may be performed by validation device 160. In other embodiments, one or more portions of process 600 may performed by one or more other components of environment 100 and/or wireless networking system 300, such as portal 130, content device 140, and/or a component of network 120.

As shown in FIG. 6, process 600 may include validation device 160 receiving validation data from user device 110 (block 610) and parsing the validation data to identify the URL for content 101 and user device 110 (block 620). For example, user device 110 may forward validation request 220 to validation device 160. Validation request 220 may include data identifying content 101 and/or user device 110. Validation request 220 may further include information identify a location associated with user device 110, subscriber information associated with user device 110 (e.g., whether user device 110 is associated with a subscriber to wireless data services offered by a service provider), activities being performed by user device 110, hardware/software present on user device 110, etc.

Validation device 160 may determine whether user device 110 is validated for content 101 (block 630). For example, validation device 160 may interface with a component of networking environment (e.g., PCRF 380 and/or billing server 390) to identify eligibility criteria for the special handling, and validation device 160 may determine whether user device 110 conforms to the eligibility criteria. In another example, validation device 160 may evaluate software and/or hardware included in user device 110 (as identified in validation request 220) and may determine whether the software and/or hardware is compatible with the special handling associated with content 101.

As shown in FIG. 6, validation device 160 may generate an extension for (e.g., sign) the URL for content 101 (block 640), may add a proxy extension identifying proxy 150 to the URL (block 650), and may forward the extended URL to user device 110 (block 660). For example, validation device 160 may generate an extension identifying the special handling when user device 110 is eligible for the special handling, and otherwise, validation device 160 may generate a different extension when user device 110 is not eligible for the special handling. In either case, validation device 160 may add the proxy extension identifying proxy 150 to the URL.

In one embodiment, validation device 160 may sign the network address for content 101 using cryptographic techniques to improve security by appending information to the original network address (e.g., the URL) based on one or more security credentials (e.g., a signing key identifier and/or a signing secret) associated with the special handling. For example, when the special handling relates to sponsored access to content 101, the signed URL address may contain special network destination information of the sponsored content, identifiers of various entities (e.g., a sponsor, a content provider, etc.), a security signature, and additional parameters that may be used in backend devices by the network provider for data accounting and billing processes.

In an embodiment, validation device 160 may sign the URL based on a keyed-hash message authentication code (HMAC) which is a process for calculating a message authentication code (MAC) involving a cryptographic hash function in combination with a secret cryptographic key. The HMAC process may be used to simultaneously verify both the data integrity and the authentication of a message. A cryptographic hash function, such as a fifth generation message digest (MD5) algorithm or a secure hash algorithm 1 (SHA-1), may be used in the calculation of an HMAC.

Figure 7:
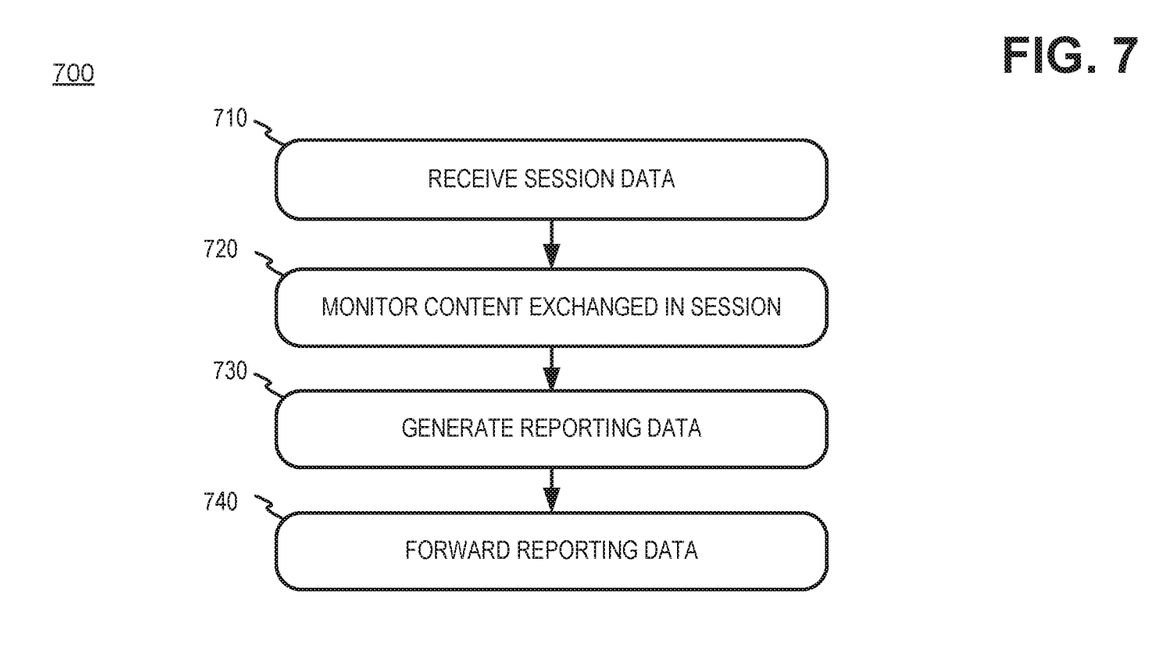
FIG. 7 is a flow chart showing an exemplary process for monitoring, by a proxy, whether special handling was applied when exchanging content within the network environment shown in FIG. 1.

FIG. 7 is a flow chart showing an exemplary process 700 for monitoring whether special handling is used for delivering content 101 to user device 110. In one embodiment, process 700 may be performed by proxy 150. In other embodiments, one or more portions of process 700 may performed by one or more other components of environment 100 and/or wireless networking system 300, such as user device 110, portal 130, content device 140, and/or a component of network 120.

As shown in FIG. 7, process 700 may include proxy 150 receiving session data (block 710). For example, portal 130 may establish a session via a first pathway between content device 140 and proxy 150 so that content 101 is forwarded to proxy 150 via the pathway. Portal 130 may determine or identify proxy 150 based on a proxy extension included in the signed URL forward from user device 110.

Proxy 150 may monitor content 101 exchanged in the session (block 720). For example, proxy 150 may identifying content 101 and/or user device 140, and may further determine whether any special handling is being used for exchanging content 101. For example, the session data (e.g., packets carrying content 101 from content device 140) may direct proxy 150 to forward the received data via another, second pathway between proxy 150 and user device 110. The session data may include portions of content 101 and further include data identifying content device 140, such as a source address. This second pathway may include portions of network 120. Proxy 150 may generate the second pathway based on instructions received from portal 130. For example, proxy 150 may cause network 120 to selectively apply special handling when forwarding content 101 to user device 110 via the second pathway. Portal 130 may forward, via the first pathway, instructions to proxy 150 to cause proxy 150 to apply the special handling, if applicable.

Proxy 150 may generate reporting data (e.g., tracking data 102) identifying content 101 and identifying whether any special handling was applied (block 730), and forward the reporting data (block 740). For example, proxy 150 may identify content 101 associated with content device 140, and proxy 150 may identify (e.g., based on instructions received from portal 130) whether special handling was applied to content 101 from content device 140. The reporting data may further identify related data (e.g., encryption data used to access content 101) and may indicate whether special handling was applied when forwarding the additional related data.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 2 and 5-7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  obtaining, by a processor and from a validation device, one or more security credentials used for signing network addresses associated with requests for content;
  intercepting, by the processor, a request from a user device to access content associated with a content device;
  determining, by the processor and based on the request, whether the request includes a special handling extension, wherein the special handling extension indicates that the content is to be sent from the content device using special handling, wherein the special handling extension is assigned by the validation device that determines, based on information received from the user device, whether the special handling should be used to forward the content to the user device, and wherein the special handling extension is appended to a network address associated with the content device based on the one or more security credentials;
  selecting, by the processor and based on the request, a proxy from a plurality of proxies;
  initiating, by the processor, a session on a pathway between the content device and the user device, wherein the pathway includes the proxy; and
  causing, by the processor, the content device to forward the content to the user device via the session, wherein the content is forwarded using special handling based on determining to send the content from the content device using the special handling, and wherein the proxy forwards, to the user device or the content device, reporting data identifying the content and indicating whether the special handling is used when forwarding the content to the user device.

2. The method of claim 1, wherein the special handling relates to sponsored access to the content, and wherein the request identifies a sponsor to be billed for the sponsored access to the content.

3. The method of claim 1, wherein initiating the session includes:
  forming a first session between the content device and the proxy; and
  forming a second session between the proxy and the user device, wherein the proxy causes a service network to apply the special handling for the content on the second session based on determining to send the content from the content device using the special handling.

4. The method of claim 1, wherein the special handling relates to routing the content to the user device through a specific node in a service network.

5. The method of claim 1, wherein the content device forwards additional data to the user device when forwarding the content, and wherein the reporting data further identifies whether the special handling is used when forwarding the additional data to the user device.

6. The method of claim 1, wherein the request includes a universal resource locator (URL) for the content, and wherein determining whether the content is to be sent from the content device using the special handling includes:
  determining whether the URL includes a special handling extension, and
  identifying the special handling based on the special handling extension.

7. The method of claim 6, wherein the user device forwards identifying data to the validation device, wherein the validation device determines, based on the identifying data, whether the user device is eligible for the special handling when receiving the content, and wherein the validation device forwards, to the user device, the special handling extension based on determining the user device is eligible for the special handling.

8. A device comprising:
a memory configured to store instructions; and
a processor configured to execute one or more of the instructions to:
  obtain, from a validation device, one or more security credentials used for signing network addresses associated with requests for content;
  intercept a request from a user device to access content associated with a content device;
  determine, based on the request, whether the request includes a special handling extension, wherein the special handling extension indicates that the content is to be sent from the content device using special handling, wherein the special handling extension is assigned by the validation device that determines, based on information received from the user device, whether the special handling should be used to forward the content to the user device, and wherein the special handling extension is appended to a network address associated with the content device based on the one or more security credentials;
  select, based on the request, a proxy from a plurality of proxies;
  initiate a session on a pathway between the content device and the user device, wherein the pathway includes the proxy; and
  cause the content device to forward the content to the user device via the session, wherein the content is forwarded using special handling based on determining to send the content from the content device using the special handling, and wherein the proxy forwards, to the user device or the content device, reporting data identifying the content and indicating whether the special handling is used when forwarding the content to the user device.

9. The device of claim 8, wherein the special handling relates to sponsored access to the content, and wherein the request identifies a sponsor to be billed for the sponsored access to the content.

10. The device of claim 8, wherein the processor, when initiating the session, is further configured to:
  form a first session between the content device and the proxy; and
  form a second session between the proxy and the user device, wherein the proxy causes a service network to apply the special handling for the content on the second session based on determining to send the content from the content device using the special handling.

11. The device of claim 8, wherein the special handling relates to routing the content to the user device through a specific node in a service network.

12. The device of claim 8, wherein the content device forwards additional data to the user device when forwarding the content, and wherein the reporting data further identifies whether the special handling is used when forwarding the additional data to the user device.

13. The device of claim 8, wherein the request includes a universal resource locator (URL) for the content, and wherein the processor, when determining whether the content is to be sent from the content device using the special handling, is further configured to:
  determine whether the URL includes a special handling extension, and
  identify the special handling based on the special handling extension.

14. The device of claim 13, wherein the processor, when determining, based on the request, whether the content is to be sent from the content device using special handling, is further configured to:
  determine whether the special handling extension is expired or was previously presented in another request,
  determine that the special handling should not be used when the special handling extension is expired or was previously presented in another request, and
  forward, when the URL include the special handling extension but the special handling was not used, a message indicating that the special handling was not used because the special handling extension is expired or was previously presented in another request.

15. A non-transitory memory to store one or more instructions that, when executed by a processor, cause the processor to:
  obtain, from a validation device, one or more security credentials used for signing network addresses associated with requests for content;
  intercept a request from a user device to access content associated with a content device;
  determine, based on the request, whether the request includes a special handling extension, wherein the special handling extension indicates that the content is to be sent from the content device using special handling, wherein the special handling extension is assigned by the validation device that determines, based on information received from the user device, whether the special handling should be used to forward the content to the user device, and wherein the special handling extension is appended to a network address associated with the content device based on the one or more security credentials;
  select, based on the request, a proxy from a plurality of proxies;
  initiate a session on a pathway between the content device and the user device, wherein the pathway includes the proxy; and
  cause the content device to forward the content to the user device via the session, wherein the content is forwarded using special handling based on determining to send the content from the content device using the special handling, and wherein the proxy forwards, to the user device or the content device, reporting data identifying the content and indicating whether the special handling is used when forwarding the content to the user device.

16. The non-transitory memory of claim 15, wherein the special handling relates to sponsored access to the content, and wherein the request identifies a sponsor to be billed for the sponsored access to the content.

17. The non-transitory memory of claim 15, wherein the one or more instructions further cause the processor, when initiating the session, to:
  form a first session between the content device and the proxy; and
  form a second session between the proxy and the user device, wherein the proxy causes a service network to apply the special handling for the content on the second session based on determining to send the content from the content device using the special handling.

18. The non-transitory memory of claim 15, wherein the content device forwards additional data to the user device when forwarding the content, and wherein the reporting data further identifies whether the special handling is used when forwarding the additional data to the user device.

19. The non-transitory memory of claim 15, wherein the request includes a universal resource locator (URL) for the content, and wherein the one or more instructions further cause the processor, when determining whether the content is to be sent from the content device using the special handling, to:
  determine whether the URL includes a special handling extension; and
  identify the special handling based on the special handling extension.

20. The non-transitory memory of claim 19, wherein the one or more instructions further cause the processor, when determining, based on the request, whether the content is to be sent from the content device using special handling, to:
  determine whether the special handling extension is expired or was previously presented in another request;
  determine that the special handling should not be used when the special handling extension is expired or was previously presented in another request; and
  forward, when the URL include the special handling extension but the special handling was not used, a message indicating that the special handling was not used because the special handling extension is expired or was previously presented in another request.

* * * * *